United States Patent Office.

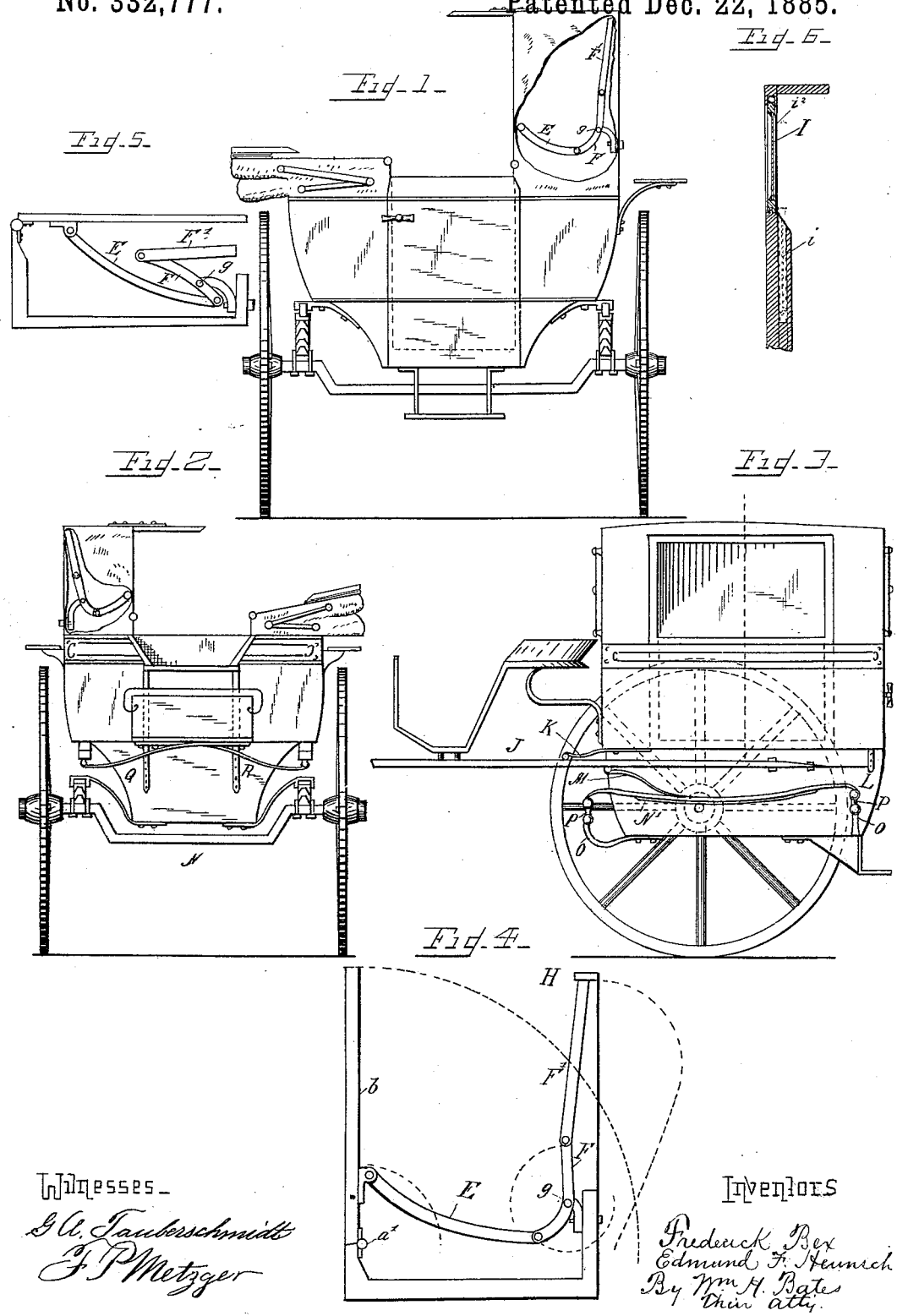

FREDERICK BEX AND EDMUND F. HEUNSCH, OF WASHINGTON, D. C.

TWO-WHEELED VEHICLE.

SPECIFICATION forming part of Letters Patent No. 332,777, dated December 22, 1885.

Application filed September 21, 1885. Serial No. 177,747. (No model.)

*To all whom it may concern:*

Be it known that we, FREDERICK BEX, a subject of the Queen of Great Britain, and EDMUND F. HEUNSCH, a citizen of the United States, residing at Washington, in the District of Columbia, have invented certain new and useful Improvements in Falling Tops for Cabs, &c., of which the following is a specification, reference being had therein to the accompanying drawings.

This invention relates to falling or folding tops for cabs and other vehicles; and it consists in the construction and novel arrangement of devices hereinafter set forth, whereby the top or cover of the vehicle is quickly and easily let down, thus converting the same into an open vehicle; and the invention further consists in the novel construction and arrangement of the springs upon which the body is mounted, as well as the driver's seat, as hereinafter fully explained.

In the annexed drawings, to which reference is made, and which fully illustrate our invention, Figure 1 represents a rear view of a vehicle, showing our device applied thereto. Fig. 2 is a front view of the same. Fig. 3 is a side view. Figs. 4 and 5 are detail views, and Fig. 6 is a detail sectional view of one of the sides of the cab, taken on the line $x\,x$, Fig. 3.

Referring by letters to the accompanying drawings, A designates the body of the vehicle, having a rear door, $a$, and mounted on wheels B, provided with a cranked axle, C.

D indicates a top, composed of two sections, $d\,d$, which are independent of one another, each of which, when lowered, fall away from one another to either side of the vehicle, and are so arranged that in their descent they fall or incline inwardly in such a manner as to occupy a space within the outer face of the hubs of the wheels. To one side of the door $a$ is hinged, as at $a'$, a standard, $b$, to which is pivoted a curved arm, E, that is in turn pivoted to the curved end of a vertical arm, F, which has its fulcrum at $g$ to the frame of the vehicle. The upper end of this arm is pivoted to the lower end of a third arm, F', which latter is secured by its upper end to the top rail, H, as clearly shown in the drawings.

It will be observed by the above description, and by reference to the accompanying drawings, that when the props or arms which support the section are thrown inwardly the top descends, each section folding to one side of the vehicle in an inclined inwardly manner, as shown in section in Fig. 4 by the dotted lines, thus bringing the top within the space between the wheels. At the same time it is easily operated, durable, and cheap to manufacture.

The sides of the vehicle are provided with sashes I, which slide when lowered in slideways $i$, made in the body of the vehicle, and when raised slide in a casing or groove, $i^2$, constructed of leather or other flexible material, which latter is designed to permit this portion of the top to fold when the cover is lowered, it being necessary always to lower the sash into the groove in the body of the vehicle before said top is lowered.

J designates a shaft, to which is pivoted on its upper face a spring, K, that is secured to the body. The rear end of this shaft is adjustably connected to a bracket or arm, L. To the under side of this shaft is pivoted one end of a spring, M, the opposite end of which is clipped to the axle N. Said clip also secures to said axle the spring N', the ends of which are connected to arms O by a link-connection, P. At the same time the foot-rest of the driver's seat is also connected to the shafts by means of the cross-springs Q R. Thus by the arrangement thereof the body of the vehicle is greatly relieved from "horse motion," or the jarring of the body by the movement of the horse.

Having thus described our invention and explained the operation thereof, what we claim as new, and desire to secure by Letters Patent, is—

1. In a vehicle-top, the herein-described devices, through the medium of which said top is permitted to be raised and lowered, consisting of the curved arm E, curved vertical arm F, having its fulcrum at $g$, and arm F', said arms E and F' being pivoted to standard b and top rail, H, respectively, all constructed, arranged, and operating as set forth.

2. The combination of the body, spring N', and shaft J, pivoted to the body in rear, and the spring K, attached to the front of the body and pivoted to the shaft J, and the spring M, pivoted at its front end to the shaft J, and its rear end clipped to the axle N, as described.

In testimony whereof we affix our signatures in presence of two witnesses.

FREDERICK BEX.
EDMUND F. HEUNSCH.

Witnesses:
WM. H. BATES,
R. FINLEY HUNT.